J. G. HAGMANN.
WHEAT HEATER.
APPLICATION FILED SEPT. 13, 1909.

945,089.

Patented Jan. 4, 1910.
2 SHEETS—SHEET 1.

Witnesses:
Theo. Laggard.
H. G. Bowman.

Inventor:
John G. Hagmann.
By C. H. Gunckel
his Attorney.

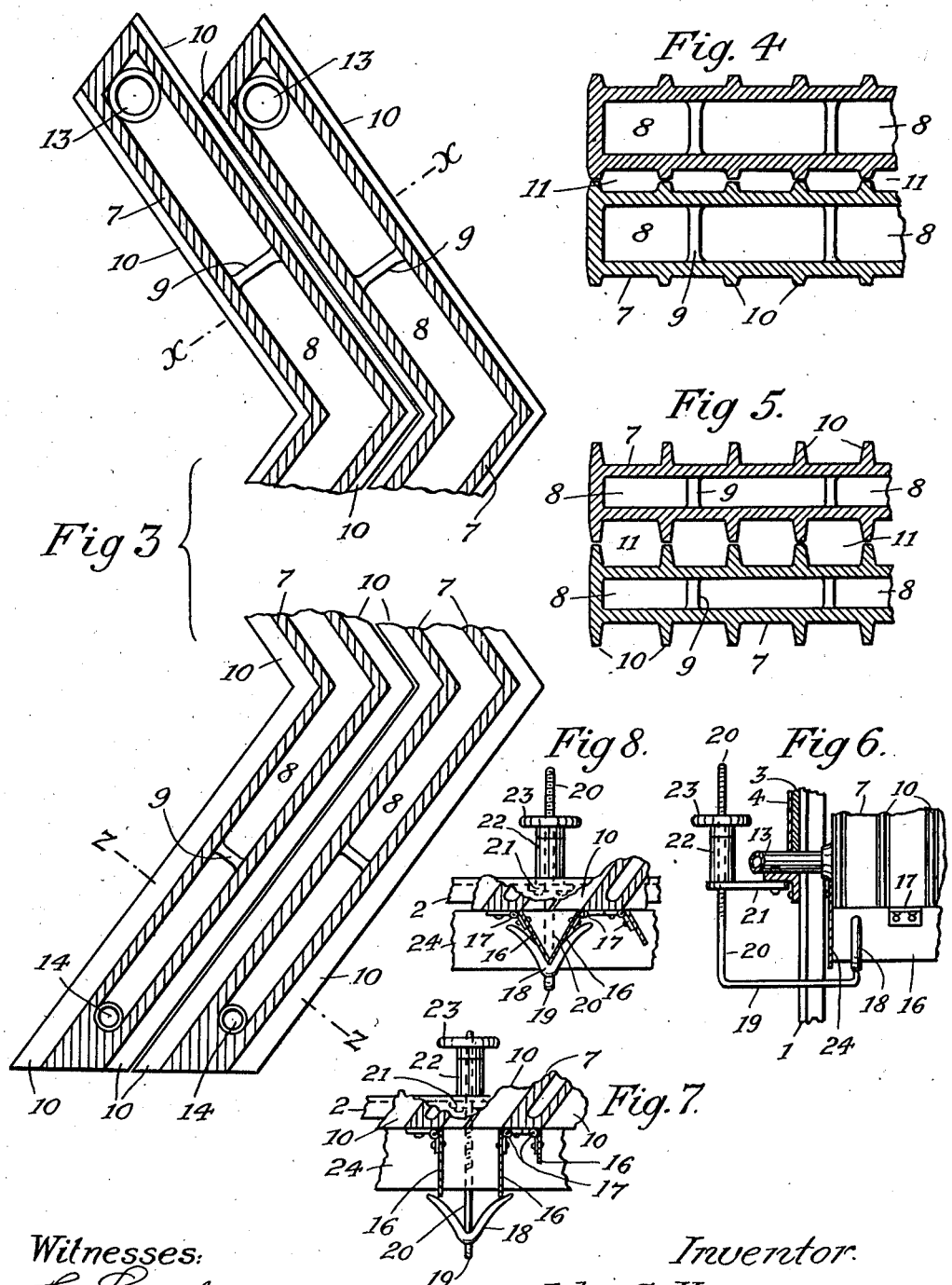

UNITED STATES PATENT OFFICE.

JOHN GEORGE HAGMANN, OF LA CROSSE, WISCONSIN, ASSIGNOR OF ONE-HALF TO GEORGE M. HEATH, OF LA CROSSE, WISCONSIN.

WHEAT-HEATER.

945,089.  Specification of Letters Patent.  Patented Jan. 4, 1910.

Application filed September 13, 1909. Serial No. 517,435.

*To all whom it may concern:*

Be it known that I, JOHN GEORGE HAGMANN, a citizen of the United States, residing at La Crosse, in the county of La Crosse and State of Wisconsin, have invented certain new and useful Improvements in Wheat-Heaters, of which the following is a specification.

My invention relates to apparatus for heating wheat or other grain preparatory to milling, and its object is to produce a compact and simple apparatus that is highly efficient in its operation and adapted to be easily maintained in working order. This object I accomplish by constructing the wheat-heating portion of the apparatus of a plurality of contiguous independent elements or sections of zigzag shape, the heating fluid flowing through a longitudinal passage-way within the body of the section while the grain gravitates through openings provided intermediate contiguous pairs of the sections. And I increase the efficiency of the apparatus by so tapering the elements that the fluid passage ways are gradually narrowed from the inlet to the outlet portions, while the grain passage-ways are gradually widened from the inlet to the outlet portions.

My improvements are illustrated in the accompanying drawings, in which—

Figure 2:
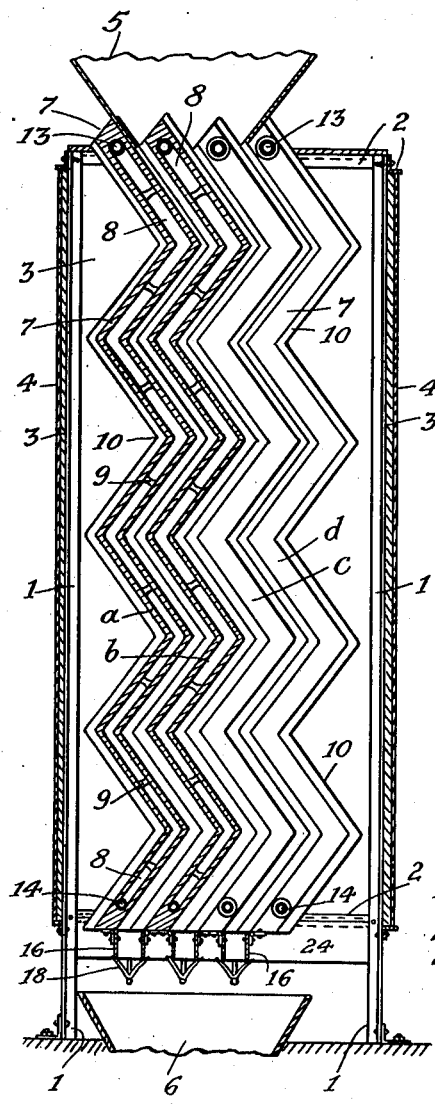
Figure 1:
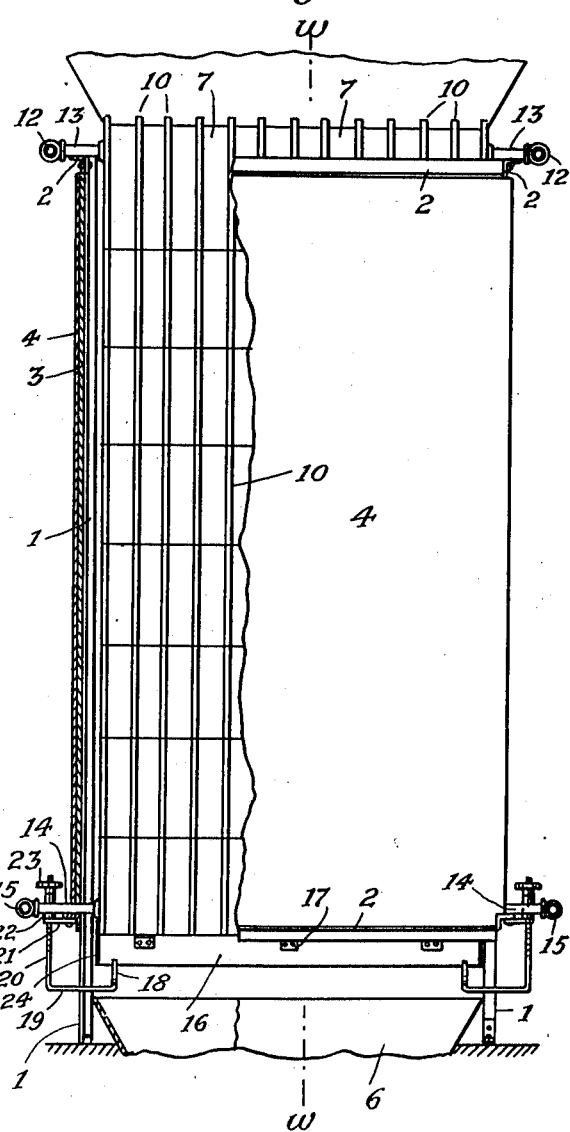

Figure 1 is an elevation of a grain heater embodying my improvements, a portion of the casing being broken away to show the heater devices. Fig. 2 is a vertical section of the apparatus on the plane of the broken line w—w of Fig. 1, a portion of the heater elements being shown in elevation and a portion in vertical section. Fig. 3 is an enlarged vertical sectional view of the upper and lower portions of a pair of the heater elements, and Figs. 4 and 5 are respectively transverse sections on the lines x—x and z—z of Fig. 3, illustrating the relative contraction of the fluid passage-ways and widening of the grain passage-ways toward the discharge end. And Figs. 6, 7, and 8 are enlarged detail views of the devices for regulating the discharge of the heated grain from the bottom of the apparatus.

In the drawings 1 designates the posts and 2 the cross-pieces constituting the rectangular frame of the apparatus; 3 designates a covering of asbestos around the sides of the frame, and 4 an outer casing of sheet-metal. Within this structure the heating devices are arranged and a feed-hopper 5 is provided at the top for introducing the grain to the heating passage-ways and a hopper 6 beneath the devices is provided for receiving and conducting away the heated grain discharged from the apparatus.

The heater proper is composed of a plurality of hollow independent sections or elements, designated $a$, $b$, $c$, and $d$, placed in juxtaposition for compactness of structure and for providing suitable intermediate passage-ways for the descent of the grain. The sections are of like construction and size and hence are interchangeable. Each section consists of a relatively wide and long but shallow metal body 7, preferably cast, providing a tight chamber 8 for the passage of a heating fluid, preferably steam, and the walls are braced at intervals by bridge-studs 9. The body is provided at both sides with longitudinal ribs 10, and both body and ribs are zigzagged at corresponding angles throughout the length of the section. The body 7 itself is made to taper gradually, both outside and inside, from the top to the bottom, while the distance between the outer edges of the ribs 10 is the same throughout the length of the section. Thus the space within the section for the passage of steam is gradually narrowed from the top to the bottom, while the height of the ribs 10 measured from the body 7 increases correspondingly from top to bottom. This construction produces, when two of the sections are placed side by side, a series of intermediate zigzag channels 11 that widen gradually between the sections from the intake to the discharge ends.

Steam is introduced to opposite sides of the chambers 8 of the sections 7 by means of steam-supply pipes 12 and short branch pipes 13 arranged near the top of the apparatus; and is discharged, together with the water of condensation, through short outlet pipes 14 which are connected to the main discharge pipes 15 arranged at the foot of the apparatus.

The wheat, or other grain, is fed to the series of passage-ways 11 from the hopper 5 and gravitates to their lower ends in zigzag courses. This movement of the grain in alternate oppositely inclined directions causes its masses to tumble over and over against the walls of the heater sections in alternation, whereby all parts of the masses in their travel may be brought in direct contact with the heating surfaces.

For regulating the discharge of grain from the passage-ways 11 gates 16 are provided and are connected to the lower ends of the sections 7 by hinges 17. The lower or free edges of the hinged gates for each passage-way 11 rest on the inclined sides of a V-shaped fork 18 which is held in vertical position on the horizontal portion 19 of a rod 20 the body of which is upright and has its upper portion screw-threaded. The rod 20 passes loosely through a hole in a bracket 21, which is attached to a post 1, and through a hollow stud 22 formed on the bracket, and a thumb-nut 23 on the threaded portion of the rod and seating on the stud enables the rod to be raised and lowered as described. In this way the fork 18 may be raised and lowered to swing the gates 16 on their hinges and thus control the discharge of grain from the passage-way. To prevent grain from escaping at the ends of the gates plates 24 are secured to the posts 1 at both ends of the gates. These devices enable the flow of the grain to be so regulated as to subject it to the action of the heating devices for longer or shorter periods as may be desired, and to stop the discharge when necessary.

The series of heater elements or sections $a$, $b$, $c$, etc., may be so assembled that each element is capable of removal edgewise from the group, for it is not necessary that the edges of the ribs 10 be in actual contact with one another to prevent grain from flowing from one passage-way into another. And the end casing and steam connection can be readily removed to permit the desired section to be withdrawn from the group and housing.

As suggestive of a desirable construction I would say that I have for some time had in successful operation apparatus in which the heating sections or elements are about six feet high, about two feet wide, the ribs placed apart about two and one-half inches from center to center, and the distance between their outer surfaces about two and one-fourth inches. The walls of the section bodies are of uniform thickness of about five-sixths of an inch throughout their length but converge sufficiently to produce a steam-chamber the depth of which is about one and three-sixteenths inches at the top and about three-fourths of an inch at the bottom. The ribs widen correspondingly from about seven-thirty-seconds of an inch high at the top to about seven-sixteenths of an inch at the bottom. The zigzag courses of the sections are at angles of about fifty degrees to a horizontal plane. But I do not wish to limit myself to these or other exact sizes or proportions, as they may be varied considerable in the production of a practical apparatus.

Having described my invention, what I claim and desire to secure by Letters Patent is—

1. In a grain heater, a series of vertically arranged zigzag heating sections provided with longitudinal ribs, the bodies of the sections providing steam passage-ways and the ribs and contiguous sections providing a series of intermediate grain passage-ways, substantially as set forth.

2. In a grain heater, a series of vertically arranged zigzag heating sections provided with longitudinal ribs, the bodies of the sections providing steam passage-ways that narrow from top to bottom and the ribs and contiguous sections providing a series of intermediate grain passage-ways that widen from top to bottom, substantially as set forth.

3. In a grain heater, a series of vertically arranged zigzag heating sections provided with longitudinal ribs, the bodies of the sections providing steam passage-ways and the ribs and contiguous sections providing a series of intermediate grain passage-ways, means for introducing steam to the upper portions and discharging it from the lower portions of the steam spaces, means for introducing grain at the top of the intermediate passage-ways, and means for regulating its discharge from the lower ends thereof, substantially as set forth.

4. In a grain heater, a series of vertically arranged zigzag heating sections provided with longitudinal ribs, the bodies of the sections providing steam passage-ways that narrow from top to bottom and the ribs and contiguous sections providing a series of intermediate grain passage-ways that widen from top to bottom, means for introducing steam to the upper portions and discharging it from the lower portions of the steam spaces, means for introducing grain at the top of the intermediate passage-ways, and means for regulating its discharge from the lower ends thereof, substantially as set forth.

5. In a grain heater, a series of vertically arranged zigzag heating sections provided with longitudinal ribs, the bodies of the sections providing steam passage-ways and the ribs and contiguous sections providing a series of intermediate grain passage-ways, means for introducing steam to the upper portions and discharging it from the lower portions of the steam spaces, means for introducing grain at the top of the intermediate passage-ways, gates arranged at the lower ends of the passage-ways, and means for moving the gates to control the discharge of the grain, substantially as set forth.

6. An element or section for a grain heater consisting of a tapering hollow metal body of zigzag shape provided on both sides with a series of longitudinal ribs the outer faces of which are equidistant throughout their length, substantially as set forth.

7. An element or section for a grain heater consisting of a tapering hollow metal body the walls of which are of substantially uniform thickness and of zigzag shape and provided on both sides with a series of longitudinal ribs the outer faces of which are equidistant throughout their length, substantially as set forth.

8. An element or section for a grain heater consisting of a zigzagged hollow metal body relatively long and wide and shallow and having its walls of substantially uniform thickness and provided on both sides with a series of longitudinal ribs the outer faces of which are equidistant throughout their length, substantially as set forth.

In testimony whereof I have signed my name to this specification in the presence of two subscribing witnesses this 2nd day of September, 1909.

JOHN GEORGE HAGMANN.

Witnesses:
A. J. PITKIN,
C. J. MARBOR.